(12) United States Patent
Kunii et al.

(10) Patent No.: US 10,369,881 B2
(45) Date of Patent: Aug. 6, 2019

(54) EVAPORATIVE FUEL TREATMENT APPARATUS

(71) Applicants: Mitsubishi Jidosha Engineering Kabushiki Kaisha, Okazaki-shi, Aichi (JP); Mitsubishi Jidosha Kogyo Kabushiki Kaisha, Tokyo (JP)

(72) Inventors: Kenichi Kunii, Tokyo (JP); Takayuki Sano, Tokyo (JP)

(73) Assignees: MITSUBISHI JIDOSHA ENGINEERING KABUSHIKI KAISHA, Okazaki-Shi, Aichi (JP); MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/336,371

(22) Filed: Oct. 27, 2016

(65) Prior Publication Data

US 2017/0129328 A1    May 11, 2017

(30) Foreign Application Priority Data

Nov. 11, 2015   (JP) ................................. 2015-221651

(51) Int. Cl.
  *B60K 6/40*      (2007.10)
  *B60K 15/035*    (2006.01)
  (Continued)

(52) U.S. Cl.
  CPC .......... *B60K 15/03504* (2013.01); *B60K 6/40* (2013.01); *B60K 15/03519* (2013.01);
  (Continued)

(58) Field of Classification Search
  CPC ................ B60K 15/03504; B60K 6/40; B60K 15/03519; B60K 15/035; F02M 25/0836;
  (Continued)

(56) References Cited

U.S. PATENT DOCUMENTS 7,841,624 B2 * 11/2010 Kobayashi ....... B60K 15/03504
                                                       180/69.4
2009/0107580 A1 *  4/2009 Enge .................... B60K 15/035
                                                         141/95

(Continued)

FOREIGN PATENT DOCUMENTS

JP         5056957 B2    10/2012
WO    WO 2010/092690 A1    8/2010
WO    WO-2013077123 A1 *  5/2013    ........... B62D 25/087

OTHER PUBLICATIONS

Chinese Office Action issued in corresponding Chinese Patent Application No. 2016109891172.5, dated Aug. 20, 2018, with an English machine translation.

*Primary Examiner* — Paul N Dickson
*Assistant Examiner* — Hilary L Johns
(74) *Attorney, Agent, or Firm* — Birch, Stewart, Kolasch & Birch, LLP

(57) ABSTRACT

An evaporative fuel treatment apparatus, which is loaded on a hybrid vehicle equipped with a fuel tank and a battery mounted forward of the fuel tank, has a sealing valve for sealing evaporative fuel in the fuel tank. The sealing valve is disposed between the battery and the fuel tank and is arranged above the battery. The evaporative fuel treatment apparatus can prevent fuel leakage from the sealing valve more reliably.

20 Claims, 3 Drawing Sheets

(51) Int. Cl.
*F02M 25/08* (2006.01)
*B60K 15/03* (2006.01)

(52) U.S. Cl.
CPC ...... *F02M 25/089* (2013.01); *F02M 25/0836* (2013.01); *B60K 2015/03302* (2013.01); *B60K 2015/03514* (2013.01); *Y10S 903/951* (2013.01)

(58) Field of Classification Search
CPC ...... F02M 25/089; F02M 25/08; F02M 33/00; F02M 33/02; F02M 33/06; Y10S 903/951; F01N 5/02
USPC ....... 180/69.4, 68.5; 123/518; 903/903, 904, 903/907, 951; 60/320
See application file for complete search history.

(56) References Cited

U.S. PATENT DOCUMENTS

2011/0297127 A1* 12/2011 Aso .................... F02M 25/0854
　　　　　　　　　　　　　　　　　　　　　　123/519
2012/0055722 A1* 3/2012 Matsuzawa .............. B60K 1/04
　　　　　　　　　　　　　　　　　　　　　　180/65.21

* cited by examiner

EVAPORATIVE FUEL TREATMENT APPARATUS

The entire disclosure of Japanese Patent Application No. 2015-221651 filed on Nov. 11, 2015 is expressly incorporated by reference herein.

TECHNICAL FIELD

This invention relates to an evaporative fuel treatment apparatus for treating evaporative fuel generated in a fuel tank.

BACKGROUND ART

Evaporative fuel which has occurred in a fuel tank presents a cause of air pollution. Thus, a vehicle with an engine is generally loaded with an evaporative fuel treatment apparatus for suppressing the discharge (dissipation) of evaporative fuel into the air. The evaporative fuel treatment apparatus, for example, has the fuel tank and an intake system of the engine connected together by a purge pipe line equipped with a canister. This apparatus allows evaporative fuel, which has occurred within the fuel tank, to be once adsorbed to activated carbon within the canister, and also introduces the fuel, which has been adsorbed to the activated carbon, into the intake system of the engine in response to the manifold vacuum pressure of the engine to burn it together with fresh air.

In recent years, vehicles equipped with an engine and a driving motor, such as plug-in hybrid electric vehicles (PHEV) and hybrid electric vehicles (HEV), have come into practical use. In such a vehicle equipped with a driving motor, a period during which the engine is stopping, namely, a period during which fuel cannot be introduced from the canister into the intake system of the engine, may last for a relatively long time. Thus, a so-called sealed type evaporative fuel treatment apparatus has been developed which provides a sealing valve between the fuel tank and the canister, and which brings the sealing valve to a closed state while the engine is stopping (see, for example, Patent Document 1).

In the evaporative fuel treatment apparatus, when the fuel tank is sealed with the sealing valve, fuel within the fuel tank may evaporate due causes, such as a rise in ambient temperature, and the internal pressure of the fuel tank may be raised. If the interior of the fuel tank is in a high pressure state and the sealing valve is damaged, there is a possibility that the fuel leaks out in a large amount. From the viewpoint of preventing fuel leakage in a collision of the automobile, moreover, it is necessary to prevent damage to the sealing valve more reliably.

PRIOR ART DOCUMENTS

Japanese Patent No. 5056957

SUMMARY

Technical Problems

The present invention has been accomplished in the light of the above-described circumstances. It is an object of this invention to provide an evaporative fuel treatment apparatus which can prevent fuel leakage from a sealing valve more reliably.

Means for solving the problems

An evaporative fuel treatment apparatus according to at least one embodiment of the present invention is an evaporative fuel treatment apparatus which is loaded on a hybrid vehicle equipped with a fuel tank and a secondary battery mounted forward of the fuel tank. The apparatus includes a sealing valve for sealing evaporative fuel in the fuel tank, wherein the sealing valve is disposed between the secondary battery and the fuel tank and is arranged above the secondary battery.

EFFECTS OF THE INVENTION

According to the present invention, there is provided an evaporative fuel treatment apparatus which can prevent fuel leakage from the sealing valve more reliably.

MODE FOR CARRYING OUT THE INVENTION

<Embodiment 1>

A mode for carrying out the present invention will now be described. The descriptions in this embodiment are illustrative, and the present invention is not limited to these descriptions.

Figure 1:
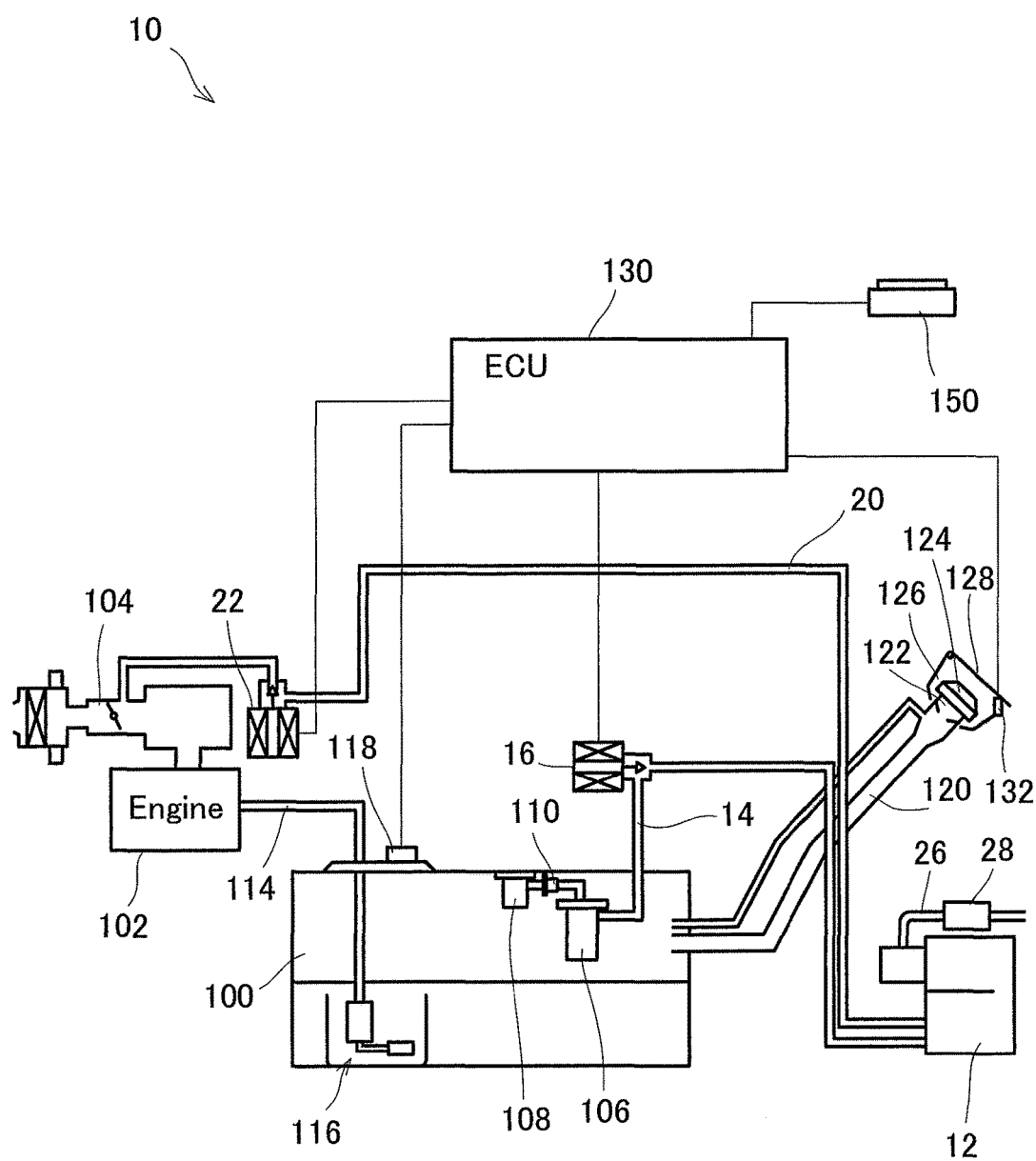
FIG. 1 is a view showing the schematic configuration of an evaporative fuel treatment apparatus according to the embodiment of the present invention.

FIG. 1 is a view showing the schematic configuration of an evaporative fuel treatment apparatus according to the present embodiment. The evaporative fuel treatment apparatus according to the present embodiment is an apparatus which is installed on a vehicle, such as a hybrid electric vehicle or a plug-in hybrid electric vehicle, for suppressing discharge (dissipation), into the atmosphere, of evaporative fuel occurring in a fuel tank storing fuel to be supplied to an engine.

An evaporative fuel treatment apparatus 10 is equipped with a canister 12, in which activated carbon is enclosed, for adsorbing evaporative fuel occurring in a fuel tank 100, and is also provided with a sealing valve 16. The canister 12 is connected to the fuel tank 100 by vapor piping 14. In detail, the vapor piping 14 has one end connected to a leveling valve 106 provided within the fuel tank 100, and has the other end connected to the canister 12. In the vapor piping 14, the sealing valve 16 is provided for opening and closing the vapor piping 14.

The sealing valve 16 is driven, for example, by an electromagnetic solenoid. Concretely, the sealing valve 16 is composed of a so-called normally closed electromagnetic valve and, when the electromagnetic solenoid is not energized, is brought to a closed state, but when the electromagnetic solenoid is energized, is brought to an open state.

The leveling valve 106 provided within the fuel tank 100 is adapted to control the liquid level of fuel within the fuel tank 100 at the time of refueling, and is disposed below a roll-over valve 108 in a vehicle body. The roll-over valve 108 prevents outflow of fuel from the fuel tank 100 to the outside by the action of a float valve, while a two-way valve 110 restricts the amount of fuel supply during refueling of the fuel tank 100 close to a full-tank state. Since the roll-over valve 108 and the two-way valve 110 are of existing configurations, their detailed explanations are omitted herein. Furthermore, the fuel tank 100 is provided with a fuel pump 116 for supplying fuel to a fuel injection valve (not shown) of an engine 102 via fuel piping 114, and is also provided with a pressure sensor 118 for detecting the internal pressure of the fuel tank 100.

The canister 12 is connected to an intake passage 104 of the engine 102 via purge piping 20. That is, in the present embodiment, the fuel tank 100 is connected to the intake passage 104 of the engine 102 by the vapor piping 14 and the purge piping 20. In the purge piping 20, a purge valve 22 for opening and closing the purge piping 20 is provided, for example, near an end close to the engine 102.

Vent piping 26 is connected to the canister 12, and the canister 12 communicates with outside air via the vent piping 26. An air filter 28 is provided halfway through the vent piping 26. The purge valve 22, like the sealing valve 16, is composed of a so-called normally closed electromagnetic valve.

To the fuel tank 100, a filler pipe 120 is connected for supplying fuel into the fuel tank 100. A fill opening 122 is provided at the end of the filler pipe 120 on the side opposite to the fuel tank 100. The fill opening 122 is configured to be sealable (to be hermetically sealed) with a fill opening cap 124. The fill opening 122 is formed in a concavity 126, and the opening of the concavity 126 can be opened and closed using a fill opening lid 128. In the present embodiment, for example, the fill opening lid 128 is configured to be held in a closed state by a locking mechanism (not shown), and to be brought into an open state upon release of the locking mechanism by operation of an opening switch 150 provided in a driver's seat of the vehicle. Near the opening of the concavity 126, a lid sensor (detection means) 132 is provided for detecting the open or closed state of the fill opening lid 128.

An ECU 130 includes an input/output device, a storage device for storing a control program, a control map, etc., a central processing unit, timers and counters. Based on information from various sensors, the ECU 130 performs the integrated control of the engine 102 including the evaporative fuel treatment apparatus 10. The ECU 130 also exercises control for closing the sealing valve 16, for example, when the engine 102 is stopped. By such types of control, adsorption of evaporative fuel to the canister 12 can be suppressed. Consequently, the starting of the engine 102 aimed at canister purge can be obviated, or the frequency of engine starting can be decreased. Thus, fuel economy can be improved.

The vehicle is provided with a battery, which is a secondary battery, and a driving motor (not shown; may be called a drive device) to be operated by power supply from this battery. The driving motor is coupled to driving wheels via a driving mechanism, although this is not shown. The driving motor drives the driving wheels via the driving mechanism and, during so-called regenerative operation, generates electricity upon receipt of rotations from the driving wheels, and supplies the electric power to the battery. The battery is rechargeable from an external power source. The ECU 130 controls, as appropriate, the action (output) of the driving motor, namely, power supply from the battery to the driving motor.

Figure 2:
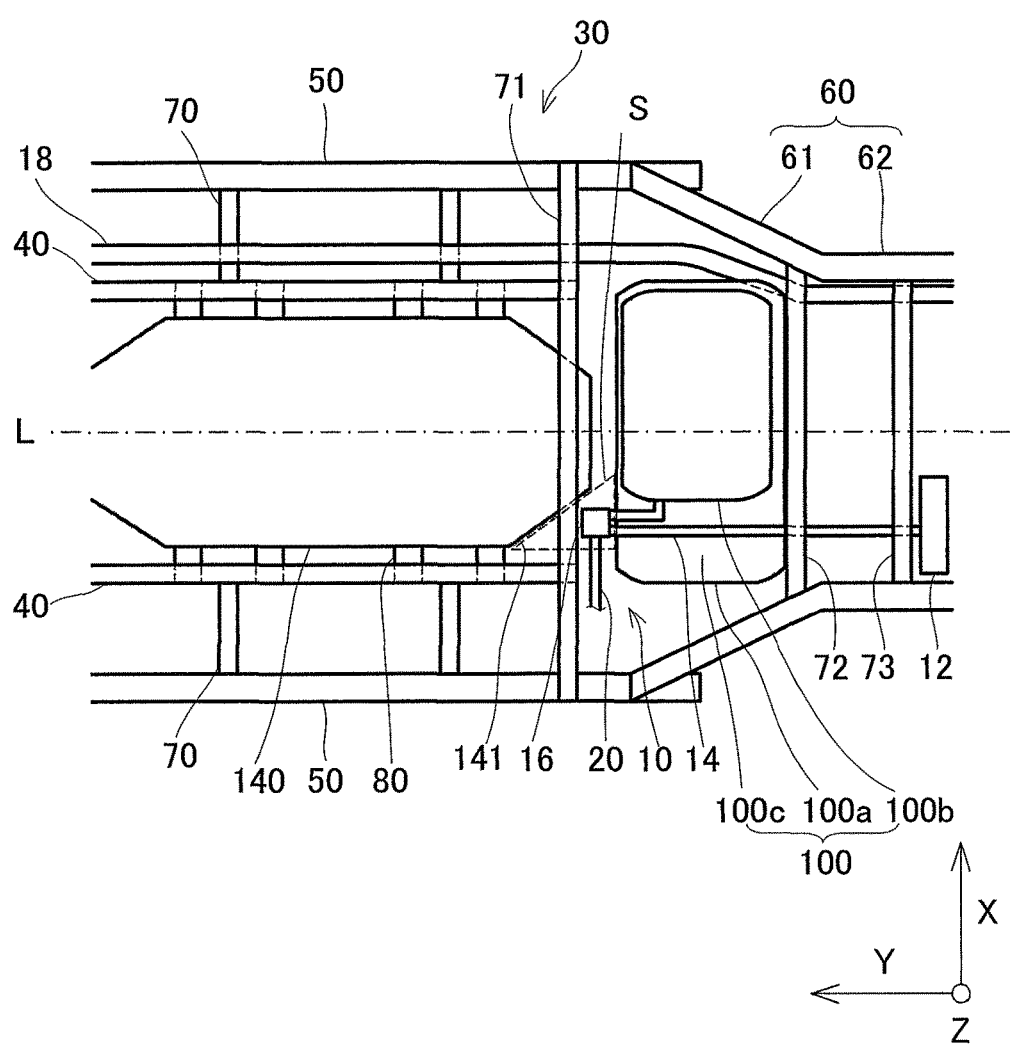
FIG. 2 is a plan view showing the evaporative fuel treatment apparatus.
Figure 3:
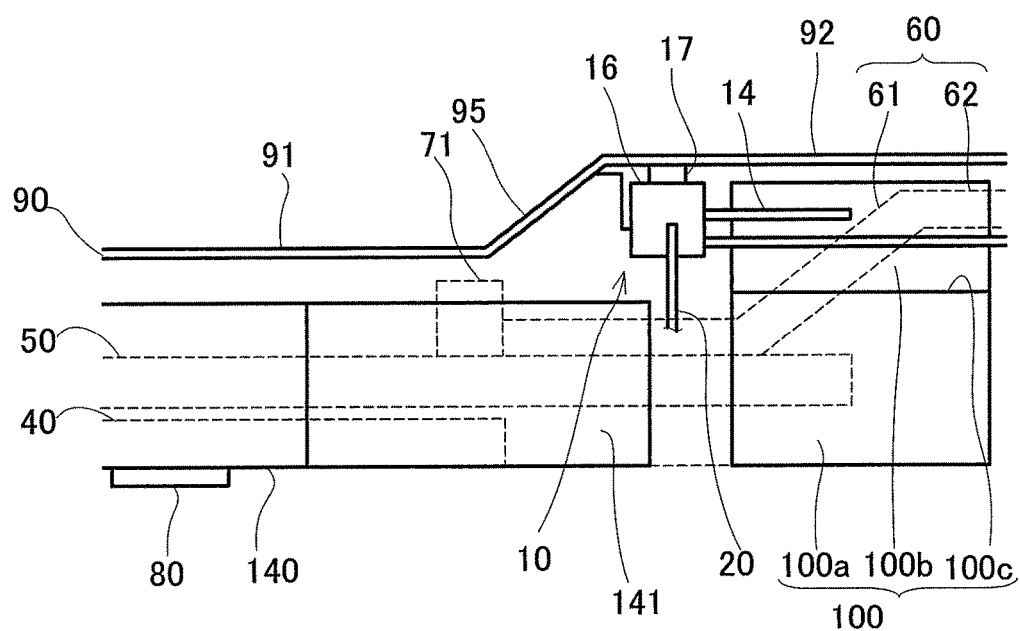
FIG. 3 is a side view showing the evaporative fuel treatment apparatus.

The evaporative fuel treatment apparatus 10 will be described in detail using FIGS. 2 and 3. FIG. 2 is a plan view showing the evaporative fuel treatment apparatus 10. FIG. 3 is a side view showing the evaporative fuel treatment apparatus 10. FIG. 2 omits an illustration of a floor panel of the vehicle. An X-direction represents the vehicle width direction of the automobile, a Y-direction represents the longitudinal direction of the automobile, and a Z-direction represents the height direction of the automobile.

The vehicle has a vehicle body frame 30 constituting the skeleton of a lower part of the vehicle. The vehicle body frame 30 includes, as members extending in the longitudinal direction of the vehicle, front side members 40, side sills 50, and rear side members 60, all as a pair (right and left). The vehicle body frame 30 also includes, as members extending in the vehicle width direction, a front cross member (not shown), a front floor side brace 70, a first rear cross member 71, a second rear cross member 72, and a third rear cross member 73.

The front side member 40 and the rear side member 60 are examples of a side member as set forth in the claim, while the second rear cross member 72 and the third rear cross member 73 are examples of a rear cross member as set forth in the claim.

Each of the above-mentioned members is formed, for example, by pressing a steel plate so that its cross sectional surface (a surface of each member formed by cutting the member with a plane perpendicular to the longitudinal direction of the member) or its cross sectional surface united with a floor panel 90 or the like to be joined thereto defines a rectangular closed cross-sectional shape.

The right and left front side members 40 as the pair are arranged, apart from each other in the vehicle width direction, in a region ranging from a front part to a central part of the vehicle. The rear end side of the front side member 40 is connected to the first rear cross member 71. In a front part of the vehicle body frame 30, a front cross member (not shown) is installed between the paired front side members 40.

Outside of the right and left paired front side members 40 in the vehicle width direction, the right and left paired side sills 50 are provided. Each side sill 50 is disposed at a distance from the front side member 40 in the vehicle width direction. These side sills 50 and the front side members 40 are connected together by a plurality of the front floor side braces 70.

At rear parts of the paired side sills 50, the paired rear side members 60 are arranged with spacing between each other in the vehicle width direction. Each rear side member 60 constitutes the rear side of the vehicle body frame 30, and has an inclined portion 61 and a horizontal portion 62 in this sequence in the front-to-rear direction.

The inclined portion 61 is a portion inclined rearwards toward the center of the vehicle body in an upward direction, and has a front end part bound to the upper surface of the corresponding side sill 50. The horizontal portion 62 is a portion continuous with the rear end of the inclined portion 61 and extended substantially horizontally along the longitudinal direction.

In between the paired rear side members 60, the first rear cross member 71 is installed. The first rear cross member 71 has right and left end parts bound to the rear side members 60. The first rear cross member 71 is also bound to the upper surfaces of the front side members 40. The first rear cross member 71 is formed in an upwardly-convexed arcuate shape, and is disposed above and astride the battery 140.

At a position separated from the first rear cross member 71 rearwardly with predetermined spacing, the second rear cross member 72 is disposed. Further at a position separated from the second rear cross member 72 rearwardly with predetermined spacing, the third rear cross member 73 is disposed. Right and left end parts of the second rear cross member 72 and the third rear cross member 73 are connected to the respective rear side members 60. On the second rear cross member 72 and the third rear cross member 73, a driving motor mounted to the rear wheels is installed, although this is not shown.

On the upper surfaces of the side sills 50, front floor side braces 70 and rear side members 60, a floor panel 90 is provided which constitutes the floor surface of the vehicle. The floor panel 90 is provided with a kick-up portion 95 constituting a part of the floor panel 90. The kick-up portion 95 is a part of the floor panel 90 inclined rearwardly upward. In the present embodiment, the kick-up portion 95 is inclined rearwardly upward in an area ranging from a site near the rear end of the first rear cross member 71 to a site ahead of the sealing valve 16. Of the floor panel 90, the forward side of the kick-up portion 95 is designated as a first floor panel portion 91, and the rearward side of the kick-up portion 95 is designated as a second floor panel portion 92.

The vehicle body frame 30 of the above-mentioned configuration is mounted with the fuel tank 100, battery 140, sealing valve 16, etc.

The fuel tank 100 is disposed within a space surrounded by the first rear cross member 71, the second rear cross member 72, and the pair of rear side members 60 in a plan view. The fuel tank 100 is also disposed below the second floor panel portion 92 on the side behind the kick-up portion 95. The fuel tank 100 is fixed to the second rear cross member 72, the floor panel 90, etc., although this is not shown.

The fuel tank 100 includes a first tank portion 100a constituting the lower side of the fuel tank 100, and a second tank portion 100b constituting the upper side of the fuel tank 100. The second tank portion 100b protrudes from the upper surface of the first tank portion 100a, and the first tank portion 100a and the second tank portion 100b form a step 100c in an upper part of the fuel tank 100.

The vapor piping 14 connected to the sealing valve 16 is routed so as to pass above the step 100c. By providing such a step 100c, the vapor piping 14 can be constituted linearly to extend from the sealing valve 16 disposed ahead of the fuel tank 100 toward the canister 12 located rearwardly of the fuel tank 100. In this configuration, the vapor piping 14 can be shortened in comparison with its bending for bypassing the fuel tank 100, so that the costs related to the vapor piping 14 can be cut down.

The battery 140 is fixed in a space surrounded by the front cross member (not shown), the front side members 40, and the first rear cross member 71, in a plan view, below the floor panel 90.

Concretely, the battery 140 is provided with a plurality of cross members 80 (also called brackets) which are members for mounting the battery 140 to the front side members 40. Each cross member 80 is a member installed in the X-direction between the battery 140 and the front side member 40, and has one end in the X-direction fixed to the side surface of the battery 140, and has the other end in the X-direction fixed to the lower surface side of the front side member 40. In the present embodiment, 4 of the cross members 80 are arranged on each side, in the X-direction, of the battery 140 with predetermined spacing in the Y-direction. Via such cross members 80, the battery 140 is fixed to the front side members 40. The cross member 80 is composed of a member having sufficient rigidity to support the battery 140 and, when the battery 140 is detached, the fixation between the cross member 80 and the front side member 40 is released.

The battery 140 has corners chamfered in a plan view. In the present embodiment, the battery 140 has chamfers 141 formed by chamfering all of the four corners. It is not necessary for the chamfers 141 to be provided at all of the four corners.

The battery 140 is disposed forward of the fuel tank 100. By making such a disposition, a gap is formed between the fuel tank 100 and the battery 140. With the present embodiment, in particular, the chamfers 141 are formed in the battery 140. Thus, a triangular gap S in a plan view is formed by the chamfer 141 on the rear end side of the battery 140, and the side surface of the fuel tank 100.

In the present embodiment, the fuel tank 100 and the battery 140 are spaced in the longitudinal direction, but this configuration is not limiting. That the battery 140 is loaded forward of the fuel tank 100 includes a mode in which the battery 140 partly overlaps or contacts the fuel tank 100 in a plan view. For example, even when the battery 140 partly overlaps or contacts the fuel tank 100, it suffices to provide a gap S, where the sealing valve 16 can be housed, by providing the chamfer 141.

In this gap S between the fuel tank 100 and the battery 140, the sealing valve 16 is disposed. That the sealing valve 16 is disposed between the fuel tank 100 and the battery 140 includes a configuration in which, as in the present embodiment, the sealing valve 16 does not overlap the fuel tank 100 or the battery 140 in a plan view, and a configuration in which a part of the sealing valve 16 overlaps the fuel tank 100 or the battery 140 in a plan view.

The sealing valve 16 is disposed above the battery 140. That the sealing valve 16 is disposed above the battery 140 includes a case where, as in the present embodiment, the sealing valve 16 is completely disposed above the battery 140, and a case where the sealing valve 16 is disposed so as to partly overlap the battery 140 in the height direction.

The sealing valve 16 is fixed to the floor panel 90 via a bracket 17. In the present embodiment, the sealing valve 16 is fixedvia the bracket 17 to the second floor panel portion 92 rearward of the kick-up portion 95 in the floor panel 90.

As shown in FIG. 2, moreover, the vehicle is provided with an exhaust pipe 18 for discharging exhaust from the engine (not shown) to the rear of the vehicle. The sealing valve 16 is disposed on the side opposite to the exhaust pipe 18 with respect to a center line L. The center line L is a hypothetical line passing the center of the vehicle in the width direction (X-direction) and extending in the longitudinal direction (Y-direction). The sealing valve 16 and the exhaust pipe 18 are arranged across the center line L from each other.

As described above, the evaporative fuel treatment apparatus 10 according to the present embodiment is configured such that the sealing valve 16 is disposed between the fuel tank 100 and the battery 140 and is disposed above the battery 140. That is, the sealing valve 16, in the longitudinal direction, is surrounded by the fuel tank 100 and the battery 140, and is thus protected from impact acting in the longitudinal direction. As a result, the sealing valve is inhibited from being damaged by impact in the longitudinal direction occurring when the vehicle collides, so that fuel leakage from the sealing valve 16 can be prevented more reliably.

In the present embodiment, the battery 140 has the chamfers 141 and forms the gaps S. By adopting such a configuration, when the vehicle collides from ahead, it is possible to retain the gaps S without their elimination, even if the battery 140 is pushed in to contact the fuel tank 100. Consequently, the possibility of the sealing valve 16 being compressed between the battery 140 and the fuel tank 100 and damaged can be reduced.

Since the sealing valve 16 is located above the battery 140, moreover, the bottom surface side of the sealing valve 16 can be protected with the battery 140. This configuration can make it difficult for a flying object, such as a pebble, to jump into the gap S and reach the sealing valve 16, when the vehicle is running. Hence, damage to the sealing valve 16 by collision of a flying object can be prevented more reliably.

Furthermore, the sealing valve 16 is arranged above the battery 140, but in a plan view, is arranged between the fuel tank 100 and the battery 140. Since such an arrangement is adopted, the sealing valve 16 is not obstructed by other members, when viewed from the bottom surface side of the vehicle. Thus, during maintenance of the vehicle, for example, work efficiency for the sealing valve 16 can be ensured.

With the evaporative fuel treatment apparatus 10 according to the present embodiment, the sealing valve 16 is disposed between the paired front side members 40 and the paired rear side members 60. By adopting such a configuration, the sealing valve 16 can be protected more reliably from impact in a collision of the vehicle from side.

With the evaporative fuel treatment apparatus 10 according to the present embodiment, the sealing valve 16 is disposed rearward of the cross members 80. By adopting such a configuration, the front of the sealing valve 16 can be protected by the cross members 80. Because of this feature, the sealing valve 16 can be prevented more reliably from being damaged under impact from ahead of the vehicle.

In the evaporative fuel treatment apparatus 10 according to the present embodiment, the sealing valve 16 is disposed forward of the second rear cross member 72 and the third rear cross member (rear cross member in the claim). By adopting such a configuration, the rear of the sealing valve 16 can be protected by the second rear cross member 72 and the third rear cross member 73. Because of this feature, the sealing valve 16 can be prevented more reliably from being damaged under impact from behind the vehicle.

In the evaporative fuel treatment apparatus 10 according to the present embodiment, the battery 140 is disposed forward of the kick-up portion 95, and the sealing valve 16 is disposed rearward of the kick-up portion 95. By adopting such a configuration, the sealing valve 16 can be disposed above further apart from the battery 140. Because of this feature, damage to the sealing valve 16 due to a flying object from the bottom surface side of the vehicle can be prevented more reliably. Since the sealing valve 16 is provided on the lower surface side of the floor panel 90, moreover, the possibility of water entering the interior of the sealing valve 16 can be reduced.

In the evaporative fuel treatment apparatus 10 according to the present embodiment, the sealing valve 16 is disposed on the side opposite to the exhaust pipe 18, with the vehicle axis along the longitudinal direction of the vehicle being a center. By adopting such a configuration, the sealing valve 16 can be separated from the exhaust pipe 18 as a heat source. Should fuel leak from the sealing valve 16, therefore, the risk of ignition can be reduced, and an electric component, such as solenoid, constituting the sealing valve 16 can be protected from heat, because the sealing valve 16 is remote from the heat source.

<Other Embodiments>

An evaporative fuel treatment apparatus according to at least one embodiment of the present invention is an evaporative fuel treatment apparatus which is loaded on a hybrid vehicle equipped with a fuel tank and a secondary battery mounted forward of the fuel tank, the apparatus comprising a sealing valve for sealing evaporative fuel within the fuel tank, wherein the sealing valve is disposed between the secondary battery and the fuel tank and is arranged above the secondary battery.

In another embodiment of the present invention, the hybrid vehicle may include a pair of side members extending in the longitudinal direction, and the sealing valve may be disposed between the side members.

In yet another embodiment of the present invention, the hybrid vehicle may include a cross member for holding the secondary battery, and the sealing valve may be disposed rearward of the cross member.

In still another embodiment of the present invention, the hybrid vehicle may include a rear cross member disposed rearward of the fuel tank, and the sealing valve may be disposed forward of the rear cross member.

In a further embodiment of the present invention, the hybrid vehicle may include a kick-up portion being a part of a floor panel and inclined rearwardly upward, and the sealing valve may be provided on the lower surface side of the floor panel and on a side rearward of the kick-up portion.

In a still further embodiment of the present invention, the sealing valve may be disposed on a side opposite to an exhaust pipe with respect to a center line passing the center in the width direction of the vehicle and extending in the longitudinal direction.

It is to be understood that the present invention is in no way limited to the foregoing embodiments. The present invention can be changed or modified, as appropriate, without departing from its spirit and scope.

For example, the vehicle body frame 30 of Embodiment 1 is not limitative, but the present invention can be applied to the vehicle body frame of any configuration. In connection with the vapor piping 14 for connecting the fuel tank 100, sealing valve 16 and canister 12, moreover, the configuration of Embodiment 1 is not limiting. The present invention can be applied to the vapor piping 14 of any configuration.

The fuel tank 100 is configured to be composed of the first tank portion 100a and the second tank portion 100b, but this configuration is not limiting.

The floor panel 90 includes the kick-up portion 95, but this feature is not limiting. The present invention may be applicable to the floor panel 90 of any shape which does not include the kick-up portion 95.

Furthermore, the sealing valve 16 may be disposed on the same side as the exhaust pipe 18 with respect to the vehicle axis as the center.

REFERENCE SIGNS LIST

10 Evaporative fuel treatment apparatus
12 Canister
14 Vapor piping
16 Sealing valve
18 Exhaust pipe
20 Purge piping
30 Vehicle body frame
40 Front side member (side member)
50 Side sill
60 Rear side member (side member)
70 Front floor side brace
71 First rear cross member
72 Second rear cross member (rear cross member)
73 Third rear cross member (rear cross member)
80 Cross member 90 Floor panel
95 Kick-up portion
100 Fuel tank
102 Engine
140 Battery (secondary battery)

The invention claimed is:

1. An evaporative fuel treatment apparatus which is loaded on a hybrid vehicle equipped with a fuel tank and a secondary battery mounted forward of the fuel tank, and a floor panel, the apparatus comprising:
a sealing valve for sealing evaporative fuel in the fuel tank,
wherein the sealing valve is disposed between the secondary battery and the fuel tank and is arranged above the secondary battery, and
wherein the sealing valve is disposed at a position higher than the secondary battery, and
wherein the sealing valve is attached to the floor panel.

2. The evaporative fuel treatment apparatus according to claim 1, wherein the hybrid vehicle includes a pair of side members extending in a longitudinal direction, and the sealing valve is disposed between the side members.

3. An evaporative fuel treatment apparatus which is loaded on a hybrid vehicle equipped with a fuel tank and a secondary battery mounted forward of the fuel tank, and a floor panel, the apparatus comprising:
a sealing valve for sealing evaporative fuel in the fuel tank,
wherein the sealing valve is disposed between the secondary battery and the fuel tank and is arranged above the secondary battery,
wherein the hybrid vehicle includes a cross member for holding the secondary battery, and the sealing valve is disposed rearward of the cross member, and
wherein the sealing valve is attached to the floor panel.

4. The evaporative fuel treatment apparatus according to claim 2, wherein the hybrid vehicle includes a cross member for holding the secondary battery, and the sealing valve is disposed rearward of the cross member.

5. The evaporative fuel treatment apparatus according to claim 1, wherein the hybrid vehicle includes a rear cross member disposed rearward of the fuel tank, and the sealing valve is disposed forward of the rear cross member.

6. The evaporative fuel treatment apparatus according to claim 2, wherein the hybrid vehicle includes a rear cross member disposed rearward of the fuel tank, and the sealing valve is disposed forward of the rear cross member.

7. The evaporative fuel treatment apparatus according to claim 3, wherein the hybrid vehicle includes a rear cross member disposed rearward of the fuel tank, and the sealing valve is disposed forward of the rear cross member.

8. The evaporative fuel treatment apparatus according to claim 4, wherein the hybrid vehicle includes a rear cross member disposed rearward of the fuel tank, and the sealing valve is disposed forward of the rear cross member.

9. An evaporative fuel treatment apparatus which is loaded on a hybrid vehicle equipped with a fuel tank and a secondary battery mounted forward of the fuel tank, the apparatus comprising:
a sealing valve for sealing evaporative fuel in the fuel tank,
wherein the sealing valve is disposed between the secondary battery and the fuel tank and is arranged above the secondary battery,
wherein the hybrid vehicle comprises a floor panel including a kick-up portion being inclined rearwardly upward, and the sealing valve is provided on a lower surface side of the floor panel and on a side rearward of the kick-up portion.

10. The evaporative fuel treatment apparatus according to claim 2, wherein the hybrid vehicle comprises a floor panel including a kick-up portion being inclined rearwardly upward, and the sealing valve is provided on a lower surface side of the floor panel and on a side rearward of the kick-up portion.

11. The evaporative fuel treatment apparatus according to claim 3, wherein the hybrid vehicle comprises a floor panel including a kick-up portion being inclined rearwardly upward, and the sealing valve is provided on a lower surface side of the floor panel and on a side rearward of the kick-up portion.

12. The evaporative fuel treatment apparatus according to claim 4, wherein the hybrid vehicle comprises a floor panel including a kick-up portion being inclined rearwardly upward, and the sealing valve is provided on a lower surface side of the floor panel and on a side rearward of the kick-up portion.

13. The evaporative fuel treatment apparatus according to claim 5, wherein the hybrid vehicle comprises a floor panel including a kick-up portion being inclined rearwardly upward, and the sealing valve is provided on a lower surface side of the floor panel and on a side rearward of the kick-up portion.

14. The evaporative fuel treatment apparatus according to claim 6, wherein the hybrid vehicle comprises a floor panel including a kick-up portion being inclined rearwardly upward, and the sealing valve is provided on a lower surface side of the floor panel and on a side rearward of the kick-up portion.

15. The evaporative fuel treatment apparatus according to claim 7, wherein the hybrid vehicle comprises a floor panel including a kick-up portion being inclined rearwardly upward, and the sealing valve is provided on a lower surface side of the floor panel and on a side rearward of the kick-up portion.

16. The evaporative fuel treatment apparatus according to claim 8, wherein the hybrid vehicle comprises a floor panel including a kick-up portion being inclined rearwardly upward, and the sealing valve is provided on a lower surface side of the floor panel and on a side rearward of the kick-up portion.

17. The evaporative fuel treatment apparatus according to claim 1, wherein the sealing valve is disposed on a side opposite to an exhaust pipe with respect to a center line passing a center in a width direction of the vehicle and extending in a longitudinal direction.

18. The evaporative fuel treatment apparatus according to claim 2, wherein the sealing valve is disposed on a side opposite to an exhaust pipe with respect to a center line passing a center in a width direction of the vehicle and extending in a longitudinal direction.

19. The evaporative fuel treatment apparatus according to claim 3, wherein the sealing valve is disposed on a side opposite to an exhaust pipe with respect to a center line passing a center in a width direction of the vehicle and extending in a longitudinal direction.

20. The evaporative fuel treatment apparatus according to claim 5, wherein the sealing valve is disposed on a side opposite to an exhaust pipe with respect to a center line passing a center in a width direction of the vehicle and extending in a longitudinal direction.

* * * * *